US005973682A

United States Patent [19]

[11] Patent Number: 5,973,682

[45] Date of Patent: Oct. 26, 1999

Saib et al.

[54] METHOD AND APPARATUS FOR INDICATING FUNCTIONAL AREAS OF A GRAPHICAL USER INTERFACE

[75] Inventors: Joseph Saib, San Diego; Kazuto Mugura, San Francisco, both of Calif.

[73] Assignees: Sony Corporation, Tokyo, Japan; Sony Electronics, Inc., Park Ridge, N.J.

[21] Appl. No.: 08/953,781

[22] Filed: Oct. 17, 1997

[51] Int. Cl.[6] .............................. G06F 3/14; H04N 7/173

[52] U.S. Cl. .......................... 345/327; 345/430; 345/467; 345/354

[58] Field of Search .................................... 345/327, 430, 345/432, 467, 144, 352, 353, 354

[56] References Cited

U.S. PATENT DOCUMENTS

| | | | |
|---|---|---|---|
| 4,751,578 | 6/1988 | Reiter et al. | 358/183 |
| 4,855,833 | 8/1989 | Kageyama et al. | 358/183 |
| 5,040,067 | 8/1991 | Yamazaki | 358/183 |
| 5,179,641 | 1/1993 | Comins et al. | 345/432 |
| 5,253,066 | 10/1993 | Vogel | 358/188 |
| 5,283,561 | 2/1994 | Lumelsky et al. | 345/340 |
| 5,315,392 | 5/1994 | Ishikawa et al. | 348/570 |
| 5,317,403 | 5/1994 | Keenan | 348/731 |
| 5,323,234 | 6/1994 | Kawasaki | 348/6 |
| 5,353,121 | 10/1994 | Young et al. | 348/563 |
| 5,398,074 | 3/1995 | Duffield | 348/564 |
| 5,416,508 | 5/1995 | Sakuma et al. | 348/3 |
| 5,436,676 | 7/1995 | Pint et al. | 348/734 |
| 5,465,113 | 11/1995 | Gilboy | 348/5.5 |
| 5,502,504 | 3/1996 | Marshall et al. | 348/565 |
| 5,512,955 | 4/1996 | Toyoshima et al. | 348/569 |
| 5,523,796 | 6/1996 | Marshall et al. | 348/589 |
| 5,524,195 | 6/1996 | Clanton, III et al. | 345/327 |
| 5,528,304 | 6/1996 | Cherrick et al. | 348/565 |
| 5,532,753 | 7/1996 | Buchner et al. | 348/569 |
| 5,532,754 | 7/1996 | Young et al. | 348/569 |
| 5,559,550 | 9/1996 | Mankovitz | 348/6 |
| 5,585,866 | 12/1996 | Miller et al. | 348/731 |
| 5,594,509 | 1/1997 | Florin et al. | 348/731 |
| 5,596,373 | 1/1997 | White et al. | 348/569 |
| 5,621,456 | 4/1997 | Florin et al. | 348/7 |
| 5,671,411 | 9/1997 | Watts et al. | 395/615 |
| 5,703,795 | 12/1997 | Mankovitz | 345/327 |
| 5,719,637 | 2/1998 | Ohkura | 348/564 |
| 5,731,844 | 3/1998 | Rauch et al. | 348/563 |
| 5,737,029 | 4/1998 | Ohkura | 348/564 |
| 5,745,909 | 4/1998 | Perlman et al. | 707/513 |
| 5,796,407 | 2/1995 | Rebiai et al. | 345/430 |

*Primary Examiner*—Raymond J. Bayerl
*Assistant Examiner*—Cuong T. Thai
*Attorney, Agent, or Firm*—Blakely, Sokoloff, Taylor & Zafman, LLP

[57] ABSTRACT

A method and apparatus for indicating functional areas of a graphical user interface are provided. A graphical interface in the form of an electronic program guide is generated. A non-textured portion of the electronic program guide is generated wherein the user can interact with functions of the electronic program guide. A textured background for the electronic program guide is generated wherein the user cannot interact with functions of the electronic program guide. The textured background of the electronic program guide is generated using a noise-pattern generator. The noise-pattern generator provides a tiled color pattern on the textured background. The tiled color pattern is randomly generated from a selectable number of colors using a selectable tile size and selectable colors.

22 Claims, 12 Drawing Sheets

DATA OF PROGRAM GUIDE

METHOD AND APPARATUS FOR INDICATING FUNCTIONAL AREAS OF A GRAPHICAL USER INTERFACE

FIELD OF THE INVENTION

The present invention relates to the presentation of channel, program, and broadcast information for a multiple channel television broadcast system. Specifically, the present invention relates to differentiating between interactive and non-interactive portions of an electronic program guide.

BACKGROUND OF THE INVENTION

Television broadcasting technology has improved tremendously since its inception. Today, television signals are broadcasted on the airwaves, through cables, and via satellite. The number of stations accessible today has increased to hundreds of stations. To select a program to view, many viewers simply "channel surf" until they find a channel that has a desirable program. Channel surfing refers to the process of using the channel "+" or "−" key to sequentially view each channel. Although some viewers find channel surfing among hundreds of stations enjoyable, most viewers prefer a more direct method for selecting a program to view.

Some prior art television channel selection guides provide a television channel selection guide which displays a listing of the channels typically in numeric order and the titles of the programs broadcasted or to be broadcasted on the channels. The viewer or user of the system may then select the channel by entering in the channel number or selecting a program. The system responds by removing the guide displayed and tuning to the station selected and displaying the broadcast signals of the station.

In the current generation of broadcasting system technology, a viewer is provided with many options regarding programs that are available for broadcast. These options include, but are not limited to, channel surfing among program descriptions while watching a particular program on one channel, on-demand selection of pay-per-view broadcasts, selection of a broadcast for automatic recording, and programming a broadcast system to tune to a preselected station at a designated time. These options are typically accessed through graphical user interfaces. As the number of viewer options increases, so to does the need for a user-friendly system interface. The prior art channel selection guides do not provide ready indications as to the functional areas of the system interface. In addition, as the channel selection guides become more interactive and provide the viewer with more selections, the lack of distinguishing features of interactive portions of the displays can lead to a great deal of viewer frustration.

SUMMARY OF THE INVENTION

A method and apparatus for indicating functional areas of a graphical user interface are provided. According to one aspect of the invention, an electronic program guide is generated that identifies the channels and programming on the channels in a broadcasting system. A system pointer is supplied on the screen under the control of the user. A non-textured portion of the electronic program guide is generated wherein the user can interact with functions of the electronic program guide. A textured background for the electronic program guide is generated wherein the user cannot interact with functions of the electronic program guide. The textured background reduces display flicker and assists the user in identifying the interactive areas of the display.

According to one aspect of the present invention, the textured background of the electronic program guide is generated using a noise-pattern generator. The noise-pattern generator provides a tiled color pattern on the textured background. The tiled color pattern is randomly generated from a selectable number of colors using a selectable tile size and selectable colors.

These and other features, aspects, and advantages of the present invention will be apparent from the accompanying drawings and from the detailed description and appended claims which follow.

BRIEF DESCRIPTION OF THE DRAWINGS

The objects, features, and advantages of the present invention will be apparent to one skilled in the art from the following detailed description in which.

DETAILED DESCRIPTION OF THE INVENTION

In the method and apparatus of the present invention the broadcast system described is a direct broadcast satellite system. However, it is readily apparent to one skilled in the art that other broadcast systems which have the capability of receiving and displaying a multiplicity of stations may utilize the method and apparatus of the present invention. Furthermore, in the following description, for purposes of explanation, numerous details are set forth, such as menus, flowcharts and system configurations, in order to provide a thorough understanding of the present invention. However, it will be apparent to one skilled in the art that these specific details are not required in order to practice the present invention. In other instances, well known electrical structures and circuits are shown in block diagram form in order not to unnecessarily obscure the present invention.

It is readily apparent to one skilled in the art that additional functions can be added to the process and functions modified or removed and still be within the spirit and scope of the invention. The system provides an innovative and user friendly access to a wealth of information regarding programming available through the broadcasting system. In the present invention a number of functions are selectable through the remote control device. It is apparent that these functions may be selectable through other devices such as a joystick or other means such as an on screen menu.

Figure 1:
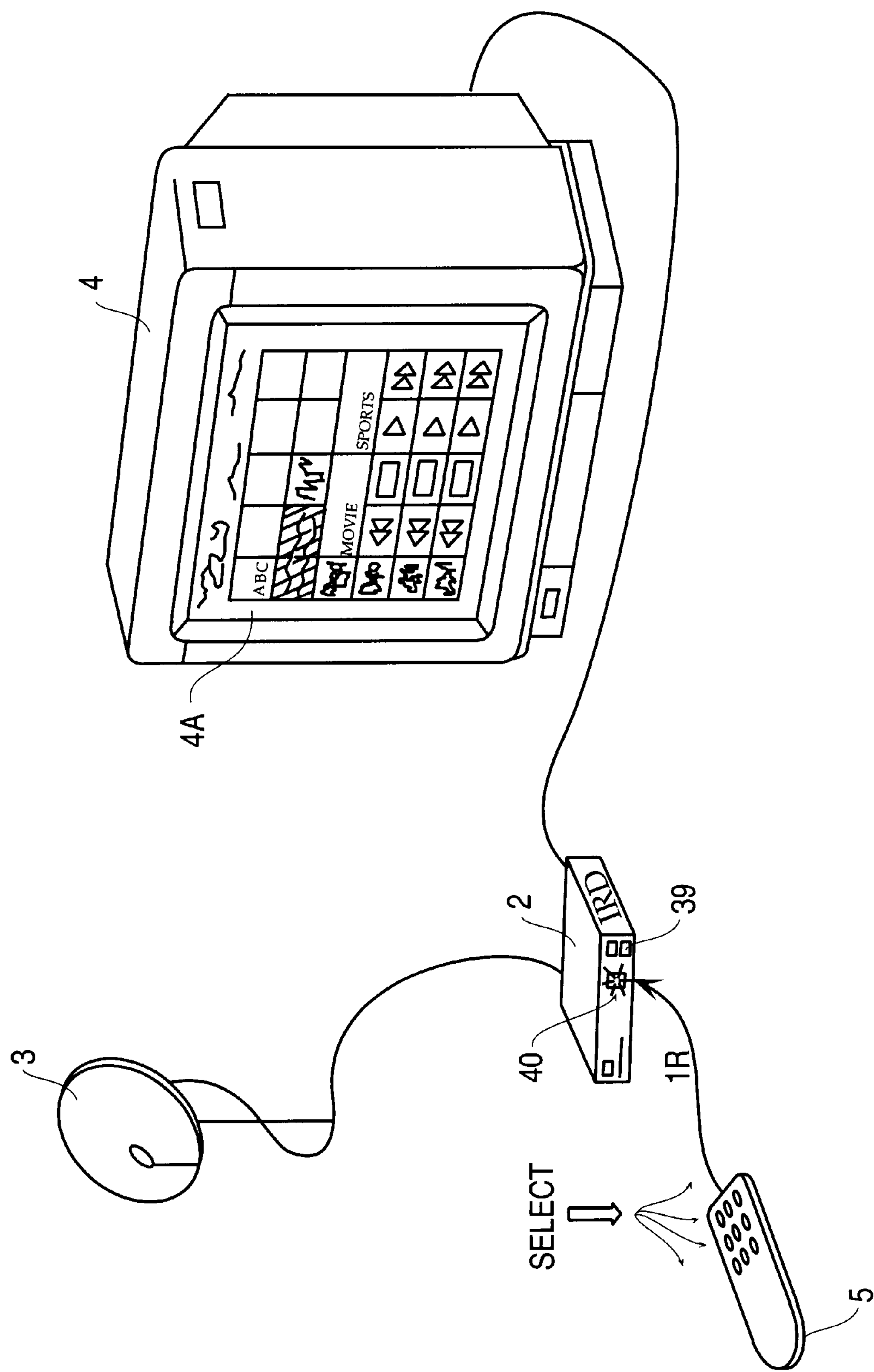
FIG. 1 is a simple illustration of one embodiment of the present invention.

FIG. 1 is a simplified diagram illustrating a Direct Satellite System (DSS). The system has an antenna 3, an integrated receiver/decoder IRD2, a remote controller 5, and a monitor 4. Packets of data are transmitted by a transponder on the satellite. Each transponder transmits data in a time share manner at a predetermined frequency. A tuner 21 of a decoder not shown in FIG. 1 is tuned in to the frequency of the transponder corresponding to a channel, which is designated by a viewer so that the packets of digital data are received by the decoder.

The antenna 3 receives an encoded data signal sent from a satellite. The received encoded signal is decoded by the IRD2. The antenna 3 has a low noise block down converter 3*a* (LNB) not shown in FIG. 1. The LNB 3*a* converts a frequency of a signal sent from the satellite to another frequency. The converted signal is supplied to the IRD2. The monitor 4 receives a signal from the IRD2.

Figure 2:
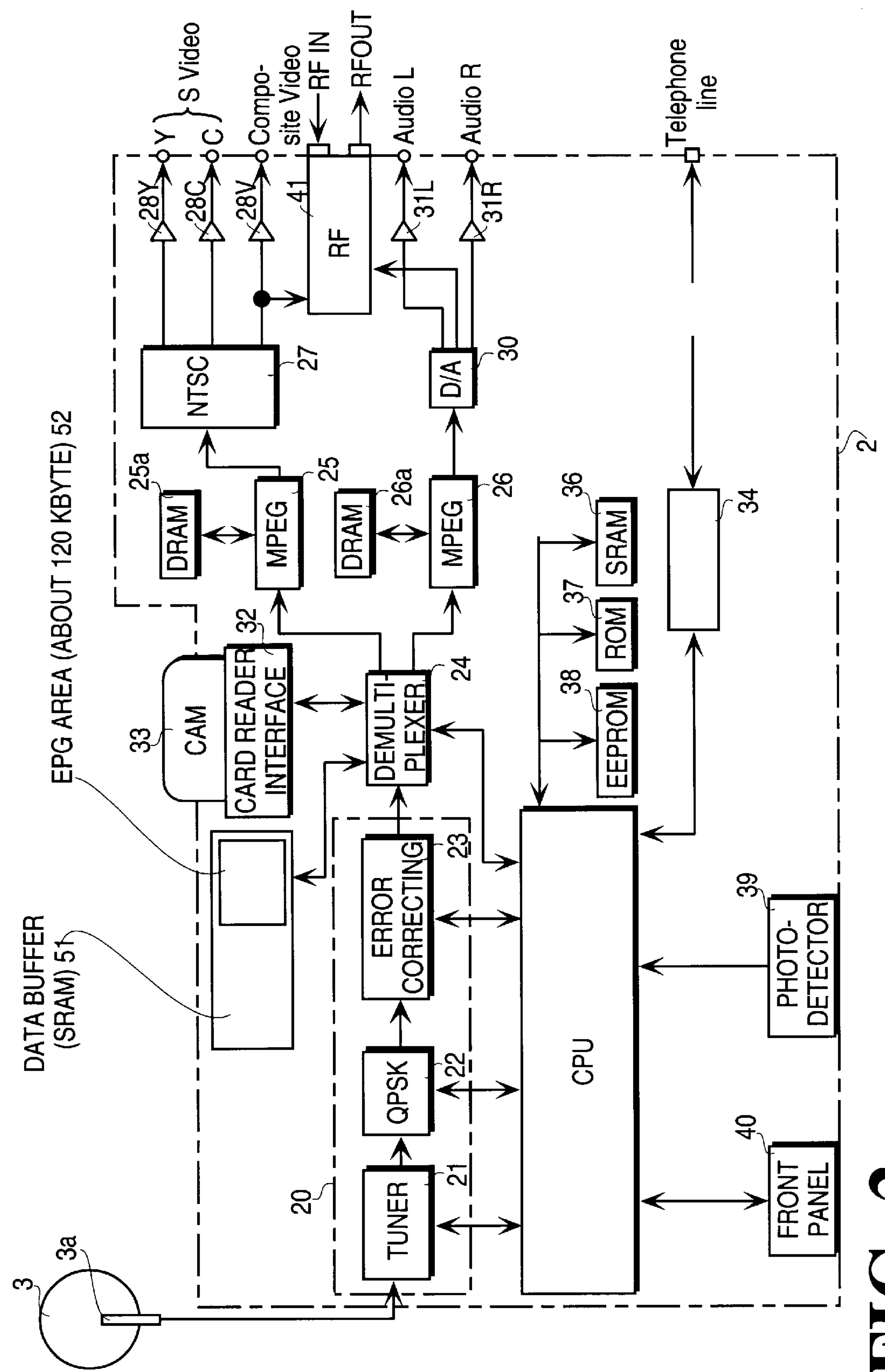
FIG. 2 is a block diagram representation of the elements utilized in the receiver of the television signals.

FIG. 2 is a block diagram of the IRD2. A radio frequency (RF) signal output from the LNB 3*a* of the antenna 3 is supplied to a tuner 21 of a front end 20. The output from the tuner 21 is supplied to a quadrature phase shift keying (QPSK) demodulation circuit 22 for demodulation. The output from the QPSK demodulation circuit 22 is supplied to an error correcting circuit 23 for error correction. The data is received in encrypted and encoded (i.e., compressed) form.

The transport IC 24 receives the data stream, consisting of packets of data, from the error correcting circuit 23 and directs portions of the data stream to the appropriate circuit for processing. The digital data stream sent from a satellite includes headers for classifying the different portions of the data in the digital data stream. The transport IC stores the headers in registers and uses the headers to direct the data. The data stream sent from the satellite includes video data in the format specified by the Motion Pictures Expert Group standard (MPEG), MPEG audio data and electronic programming guide (EPG) data. Data that is identified by its header to be video data is transferred to MPEG video decoder 25. Data that is identified by its header to be audio data is transferred to MPEG audio decoder 26. Similarly, data having a header that identifies the data to be EPG data is transferred to a predetermined area in the data buffer 51 designated to store the EPG.

A conditional access module 33, includes a central processing unit (CPU), a read-only memory (ROM) and a random access memory (RAM). The conditional access module determines whether the user has the authorization to receive certain data, e.g., audio/video for a pay TV station, using the authorization information stored in its memory. Thus, if the conditional access module determines that the user is authorized access, a key to decrypt the incoming data is provided to the transport IC 24, which decrypts the data using the key provided. In one embodiment, a smart card is utilized. This card is inserted into the card reader interface 32 for interface to the transport IC 24. It is readily apparent to one skilled in the art that the conditional access module is not limited to smart cards and may be configured in other kinds of circuitry.

The MPEG video decoder 25 decodes the video signal received from the transport IC. Dynamic random access memory (DRAM) 25*a*, connected to the MPEG video decoder 25, is used for buffering and storage of video data during processing by the MPEG video decoder. The decoded digital video signal is supplied to a National Television System Committee (NTSC) encoder 27 and converted to a luminance signal (Y) and a chroma signal (C) which are respectively output through a buffer amplifier 28Y or 28C as an S video signal. A composite video signal is also output through a buffer amplifier 28V.

The MPEG audio decoder 26 decodes the digital audio signal. DRAM 26*a*, connected to the MPEG audio decoder 26, is used for buffering of data and information during processing by the MPEG audio decoder 26. The decoded digital audio signal is converted into an analog audio signal by D/A converter 30. The left audio signal is output through buffer amplifier 31L and the right audio signal is output through buffer amplifier 31R.

An RF modulator 41 mixes a composite signal output from the NTSC encoder 27 with an analog audio signal output from the D/A converter 30. The RF modulator 41 converts the mixed signal into an RF signal and outputs the RF signal therefrom.

The CPU 29 is the central control mechanism and executes code stored in the ROM 37 to perform certain functions of the system. For example, the CPU processes certain data to control the generation of the program list in accordance with the teachings of the present invention. In addition, the CPU receives and processes the user input, received from the front panel buttons or switches 40 and the photodetector circuit 39 to provide the user functionality and access to the system described herein. In addition, the CPU accesses user settings/preferences for processing of information and configuration of the system. The user settings are stored in the non-volatile memory, such as electrically erasable programmable read-only memory (EEPROM) 38. In addition, the CPU maintains a list of pointers, stored in static random access memory (SRAM) 36, to the channel information and program information stored in the SRAM 51. Thus, when a user wishes to display a form of the EPG on the screen, the CPU 29, accessing pointers stored in the SRAM 36, communicates to the transport IC 34 to retrieve the data from the data buffer (SRAM) 51 identified by the pointers. The CPU then formulates the format and other digital data which forms the guide or list on the screen and forwards the data representative of the guide/list to the transport IC 34 which forwards the data to the DRAM 25*a* of the MPEG video decoder 25 for subsequent output to the screen.

Figure 3:
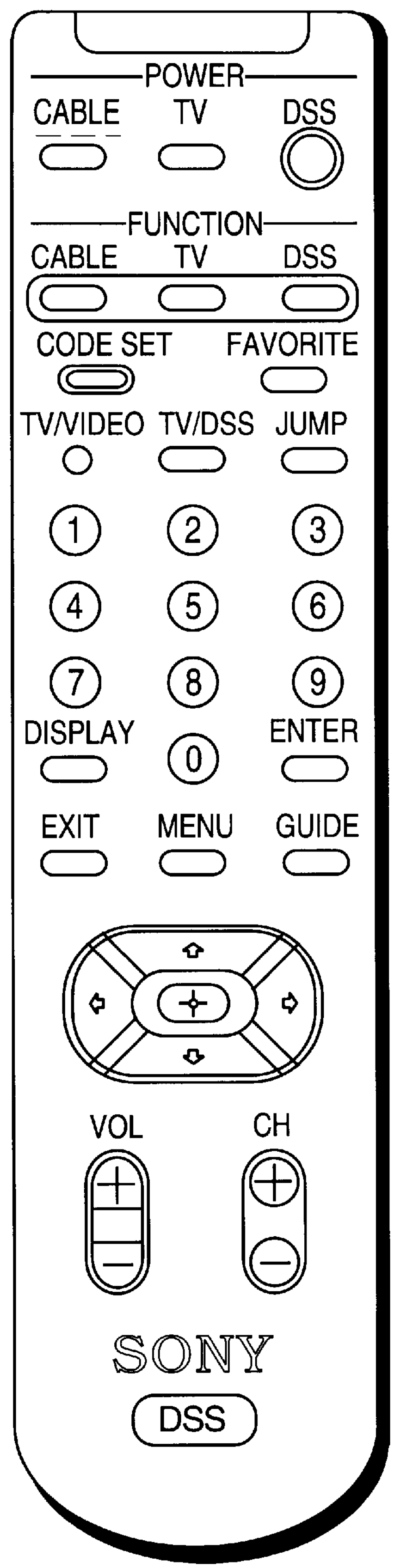
FIG. 3 is a representation of a remote control utilized to tune television stations in accordance with the teachings of the present invention.
Figure 4:
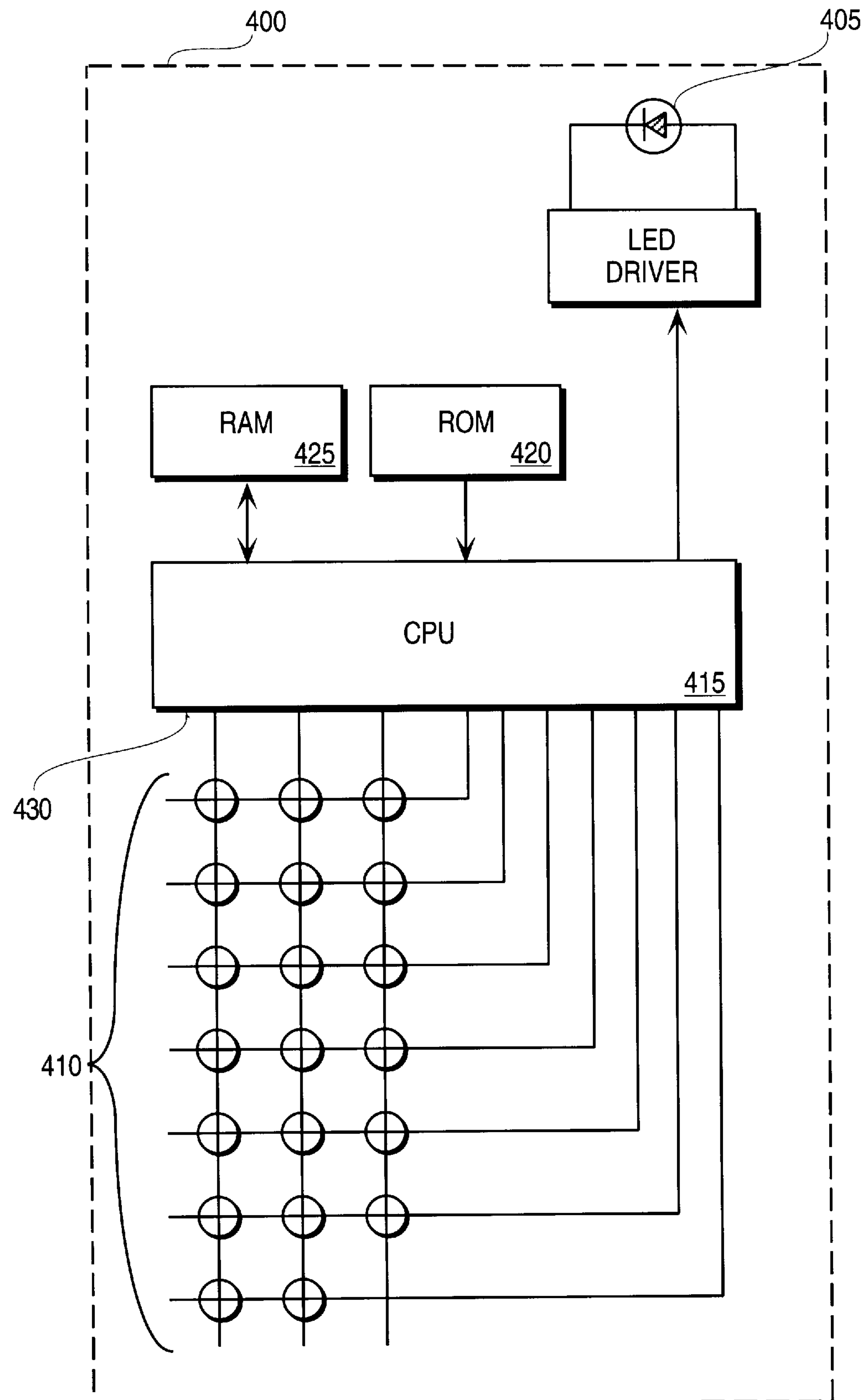
FIG. 4 is a simplified block diagram of the circuitry utilized in a remote control device.

FIG. 3 shows an example of a remote controller utilized by a user to transmit commands and make program selections in accordance with the teachings of the present invention. FIG. 4 is simplified a block diagram of the remote controller. The remote controller 400 has an infrared originating device 405, a set of operation buttons 410, a CPU 415, a ROM 420 and a RAM 425. The CPU 415 receives a signal sent from an operation button 410 through an input port 430. The signal is processed according to a program stored in the ROM 420. The RAM 425 is used as a working space so as to produce a transmitting code. The transmitting code is sent to the infrared originating device 405 through an output port and converted into an infrared signal. The infrared signal is transmitted to the IRD. The operation buttons 410 include a direction key for designating a pointer direction such as north, south, east and west, an "EPG" key, a "FAVORITE" key, a "SELECT KEY", a "MENU" key, an "EXIT" key, a ten-key numeric keypad and an "ENTER" key. The set of operation buttons 410 enable the user to select programs through the electronic programming guide.

Figure 5:
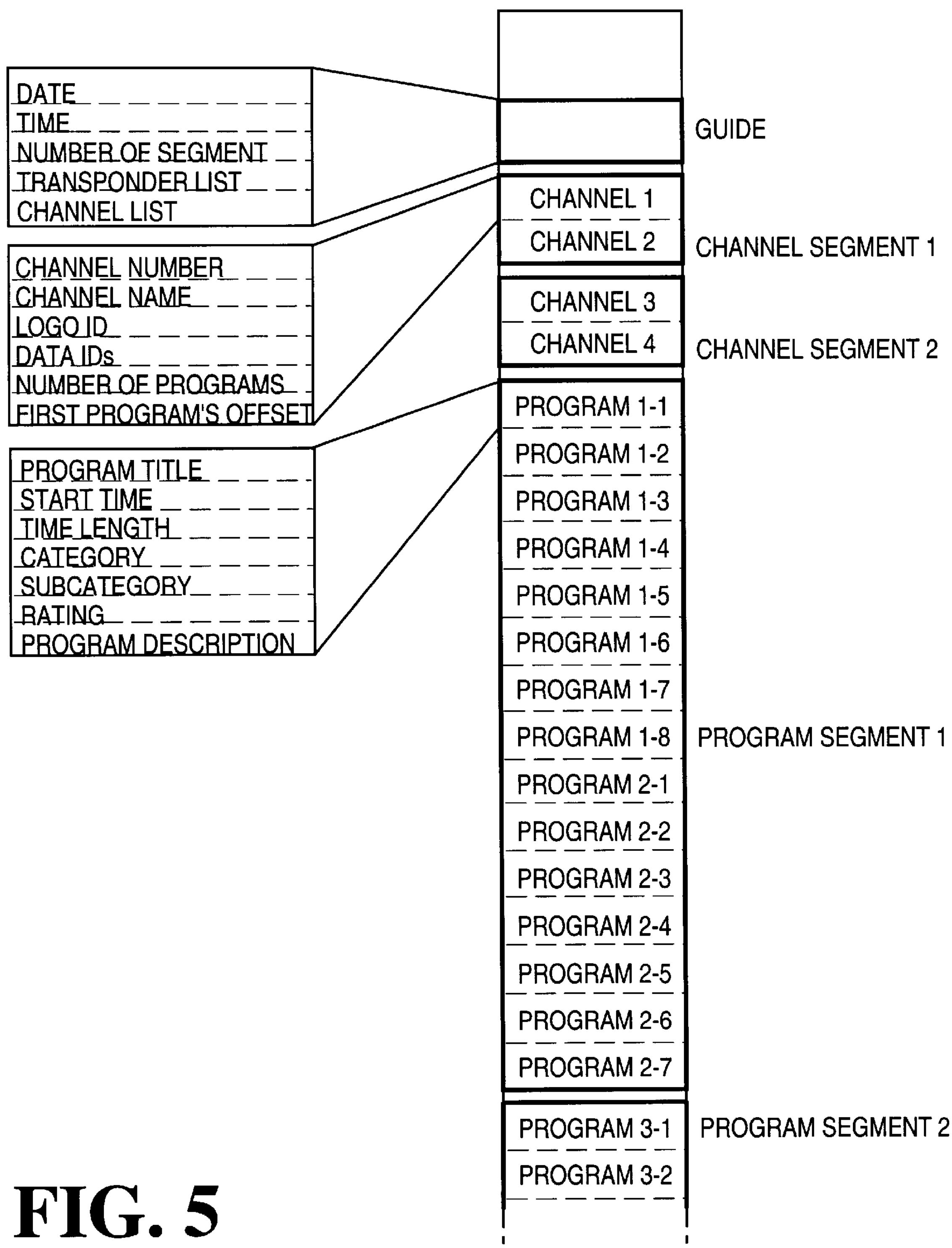
FIG. 5 illustrates the type of data utilized to present the electronic program guide in accordance with the teachings of the present invention.

FIG. 5 is a block diagram illustration of the data stored in a portion of the data buffer RAM 51. As noted above, the RAM 51 stores EPG data including guide data, channel data, and program data. General information is included in the guide data, for example, the current date and time. The transponder list identifies the number of the transponder transmitting a segment. The channel list identifies the channel number of the first channel of a portion of data. The channel data includes data relating to channels, such as the channel number, channel name (i.e., the call sign of a broadcast station), logo ID (i.e., an identification of the channel logo), data ID, which is an identification of a channel number of MPEG video data or MPEG audio data, number of programs, which identifies the number of programs to be transmitted on a channel during a predetermined time frame, and first program offset which identifies the offset from the header to the first channel data in a segment.

The program data includes the program title, start time of the program, time length of the program, program category such as movies, news, sports, etc., program subcategory such as drama, horror, children's movies or baseball, basketball, football for the sports category, the movie rating and program description that provides a detailed description of the program.

Figure 6:
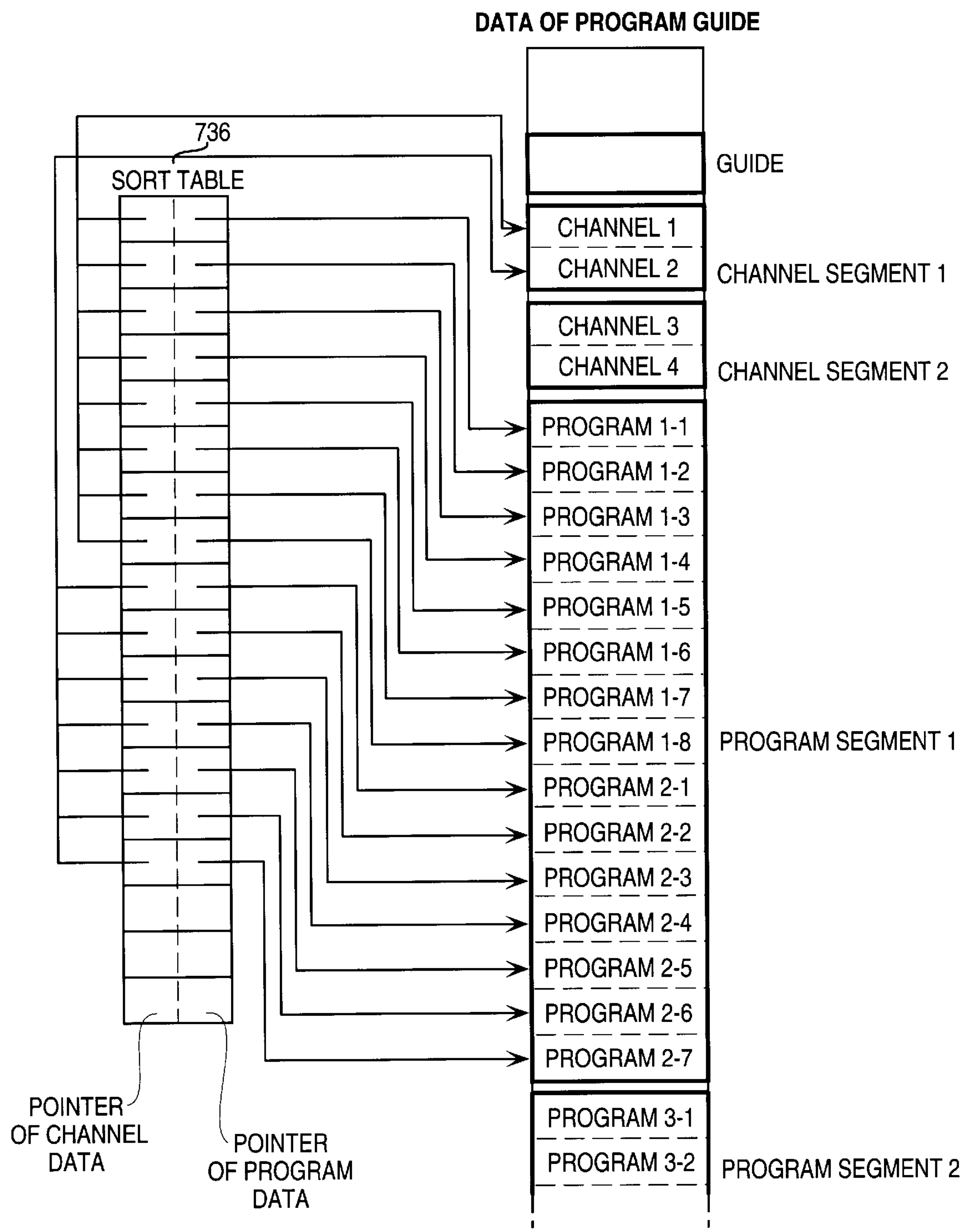
FIG. 6 illustrates the pointers to the data utilized to generate the electronic program guide in accordance with the teachings of the present invention.

FIG. 6 illustrates how pointers to the EPG data are sorted for display on a guide on the user's television screen. As noted above, EPG data includes guide data, channel data and program data which are stored in the Data Buffer (RAM) of the IRD (as shown in FIG. 2). When a viewer selects a channel, the CPU of the system determines the packet containing the channel information and extracts the transponder number from the channel information. The system front end starts tuning in the frequency of the designated transponder so as to receive the data transmitting from that transponder. If a viewer does not select any channel, the last channel is preferably designated.

As noted above, the CPU generates a table of pointers 736 to the EPG stored in the memory. The table 736 is used for changing the order of channels or programs according to the information to be presented in the guide to the user. The table 736 includes an entry for the address pointer to the corresponding channel data and an entry to the corresponding program data.

A table for generating display information is stored in the ROM 37. Certain data from the table is read out from the ROM 37 and stored in DRAM 25*a*. Preferably the data is stored in compressed form. Therefore, when a character is displayed on a screen, the compressed character array is decoded so as to generate the character to be displayed. The encoder references a dictionary which includes a set of words and frequently used portions of words and numbers corresponding to each word or portion of a word. The encoder encodes each word to each number by using the dictionary. The decoder references the same dictionary as the encoder to perform the decode function. Once decoded, each character of the decoded word includes a character code corresponding to an American Standard Code for Information Interchange (ASCII) code. Nonvolatile memory (e.g., EEPROM 38) has two tables. The first table contains character bitmaps in the different fonts available for each character. The second table identifies the address in the first table at which to extract the character bitmap. The address is determined according to the character code. The bit map image of the character is transmitted to DRAM 25*a* and subsequently accessed to display the character on the screen.

In one embodiment of the present invention, the channel data is received from a predetermined transponder and the channel number and channel name are stored in DRAM 25*a*. Additional channel information such as the channel logo is stored in the ROM 36. The ROM 36 preferably includes a table of Logo IDs and the address of Logo Data stored in ROM 36. Therefore, once a Logo ID is determined, the address of the Logo Data is determined, retrieved and stored in DRAM 25*a*.

The channel data provides the beginning address of the program data for a particular program. The actual location on the screen at which the program information is displayed is dependent upon the format of the guide. For example, in a time-based system, the location where the program title is displayed is determined by the start time and time length stored in the program data.

Using this information downloaded from the satellite transmission, programming and channel selection information is provided to the viewer. In the system and method of one embodiment of the present invention, this information is provided to the user in an innovative manner in order to enable the viewer to easily determine and select stations or programs to be viewed.

Figure 7:
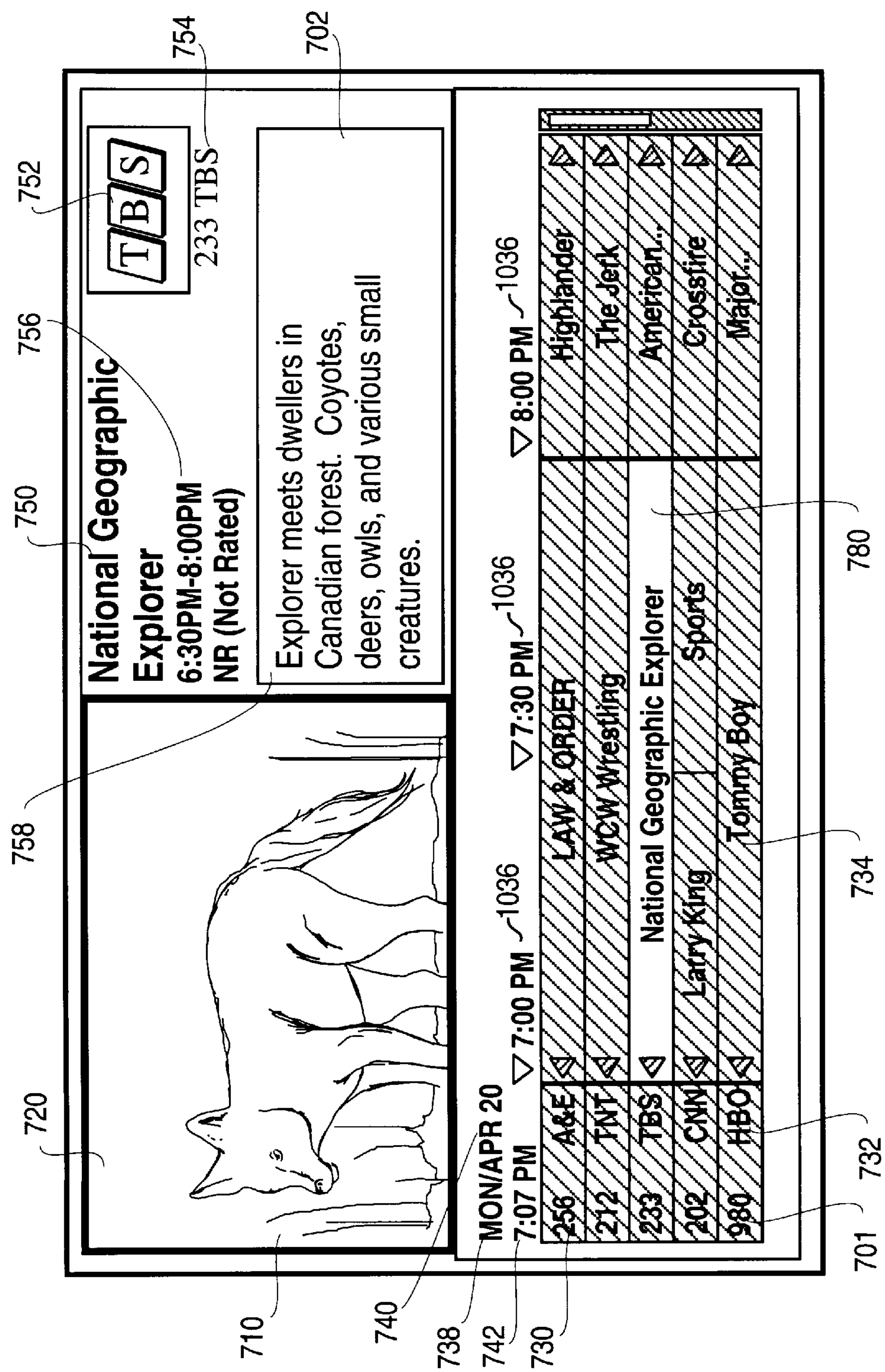
FIG. 7 illustrates the display of an electronic program guide along with a program broadcast on a screen in one embodiment of the present invention.

FIG. 7 illustrates one embodiment of a display of an electronic program guide 701 with the program broadcast 710 on a screen 720. The electronic program guide 701 includes the broadcast channel number 730, the broadcast network identification 732, the program title 734, the start and end times for a program 1036, the current day 738, the current date 740, and the current time 742. It is readily apparent that other embodiments of displays of electronic program guides presenting different information may be utilized.

In an embodiment of the present invention, a user is able to readily view not only the broadcast audio and video, but also the electronic program guide of programming and the program description. A display information packet 702 containing a description of the program broadcast may be displayed with the electronic program guide 710. The display information packet 702 also contains the program title 750, the broadcast network identification 752, the broadcast channel number 754, the start and end times of the program 756, and the program rating 758. Alternatively, the user may selectively replace the display of the display information packet 702 with the display of an electronic category guide. The electronic category guide contains a listing of programming categories. After viewing the programming selections on the electronic program guide, a viewer may deselect the electronic program guide display. The electronic program guide display is also deselected upon selection of a channel by the user.

Because the number of television broadcasting stations accessible today includes hundreds of stations, many viewers channel surf until they find a channel that has a desirable program. Channel surfing refers to the process of using the channel plus or minus key to sequentially view each channel. While some viewers find channel surfing among hundreds of stations enjoyable, some viewers prefer a more direct method of program selection. For this reason, an embodiment of the system of the present invention uses two modes, a non-channel surfing mode and a channel surfing mode, from which a user may select channels to view.

When the user selects the non-channel surfing mode in the broadcast system of the present invention, the broadcast system is first tuned to a channel to provide a broadcast of a program on the screen or display. The user then selects a display of an electronic program guide for identifying the channels available on the broadcast system and the programming available on the channels. A display information packet is displayed along with the electronic program guide, and the display information packet contains a description of the program to which the broadcast system is currently tuned. Furthermore, a system pointer is displayed on the electronic program guide. The system pointer is used to select a program for viewing by the user and, as such, may be manipulated by the user within the area of the electronic program guide. In the non-channel surfing mode the broadcast system is tuned to the channel that is pointed to by the system pointer. Furthermore, the display information packet displays a program description for the program to which the broadcasting system is tuned. Therefore, when the user manipulates the system pointer to a different channel in the non-channel surfing mode, the broadcast system tunes to that channel and displays the program currently being broadcast on that channel.

Figure 8:
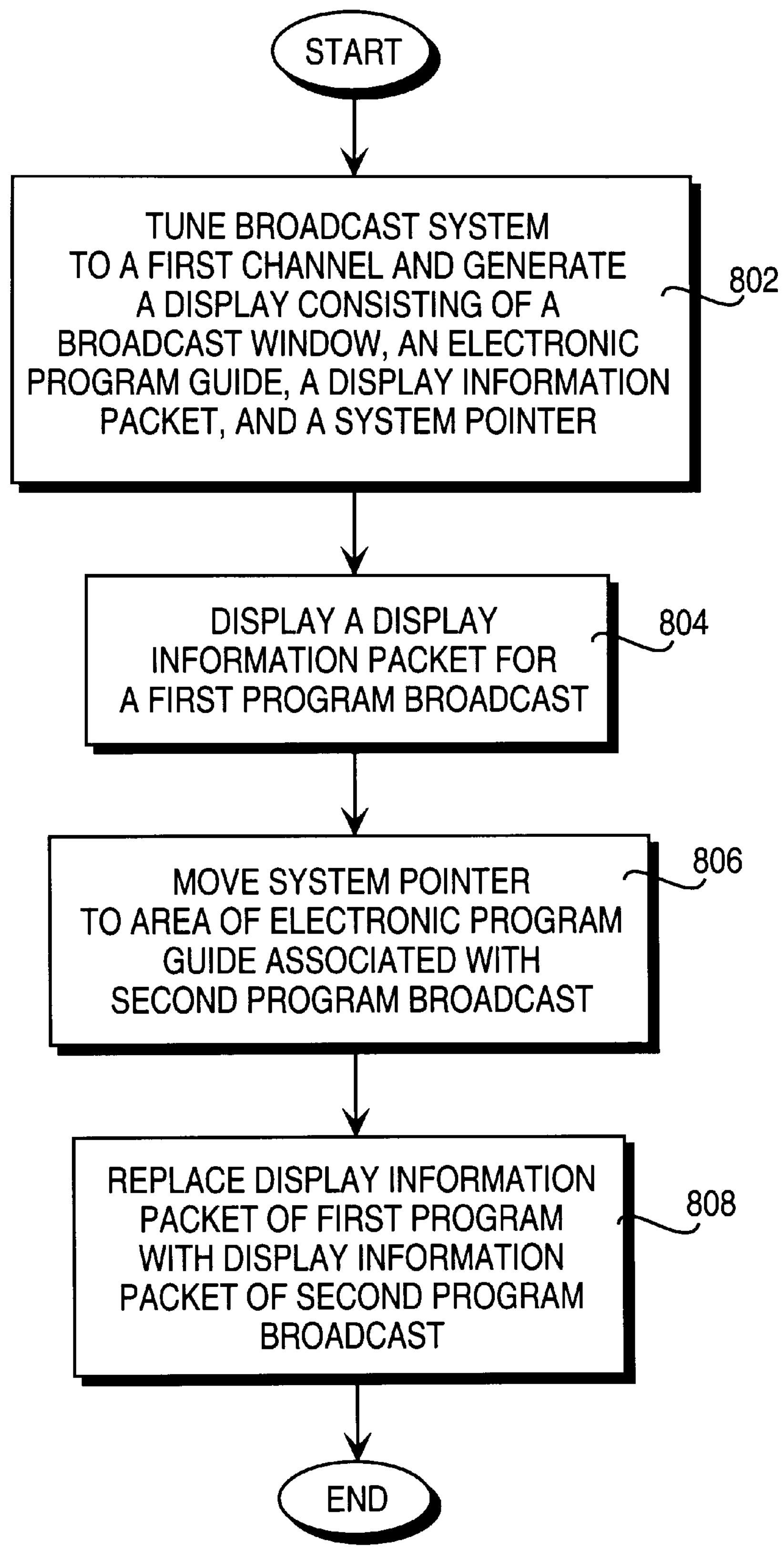
FIG. 8 is an exemplary flowchart illustrative of the channel surfing mode in one embodiment of the present invention.

FIG. 8 is an exemplary flowchart illustrative of the process of the channel surfing mode in one embodiment of the present invention. At Block 802, the broadcast system is tuned to a first channel and a display is generated consisting of a broadcast window, an electronic program guide, a display information packet, and a system pointer. A first program broadcast is displayed in the broadcast window. A display information packet is displayed for the first program broadcast, at Block 804. This display information packet contains a description of the first program broadcast. At Block 806, the user moves the system pointer to an area of the electronic program guide associated with a second program broadcast. Operation continues at Block 808, at which the broadcast system replaces the display information packet of the first program with a display information packet of a second program broadcast. The broadcast system remains tuned to the first program broadcast and continues to display the first program broadcast.

In the channel surfing mode the user may manipulate the system pointer to a program or channel in the electronic program guide that is different from the program or channel currently being broadcast. For this reason, it is preferred that the broadcast system provides in the electronic program guide an indication to the user as to the status of the broadcast system tuner and the system pointer. However, the status indication is not required to operate the channel surfing mode in accordance with the teachings of the present invention.

Each program displayed in the electronic program guide is displayed in a program block or area that is associated with a particular channel and a particular time slot. The status indication is provided by controlling the appearance of the program block in accordance with the location of the system pointer and the channel to which the system is tuned. In particular, when the broadcast system is tuned to a program, and therefore the broadcast window displays the programming of the channel the system is tuned to, the corresponding program block is displayed on the electronic program guide as appearing to be depressed into the screen. The program blocks of the remaining programs not broadcasted but shown in the electronic program guide appear to be protruding from the screen. Therefore, when the broadcasting system is not tuned to a program the corresponding program block is displayed on the electronic program guide as appearing to be protruding from the screen. The status indication of the system pointer causes a different effect. In particular, when the system pointer is pointing to a program the corresponding program block is displayed as highlighted on the electronic program guide. When the system pointer is not pointing to a program the corresponding program block is displayed as not highlighted on the electronic program guide.

Figure 9:
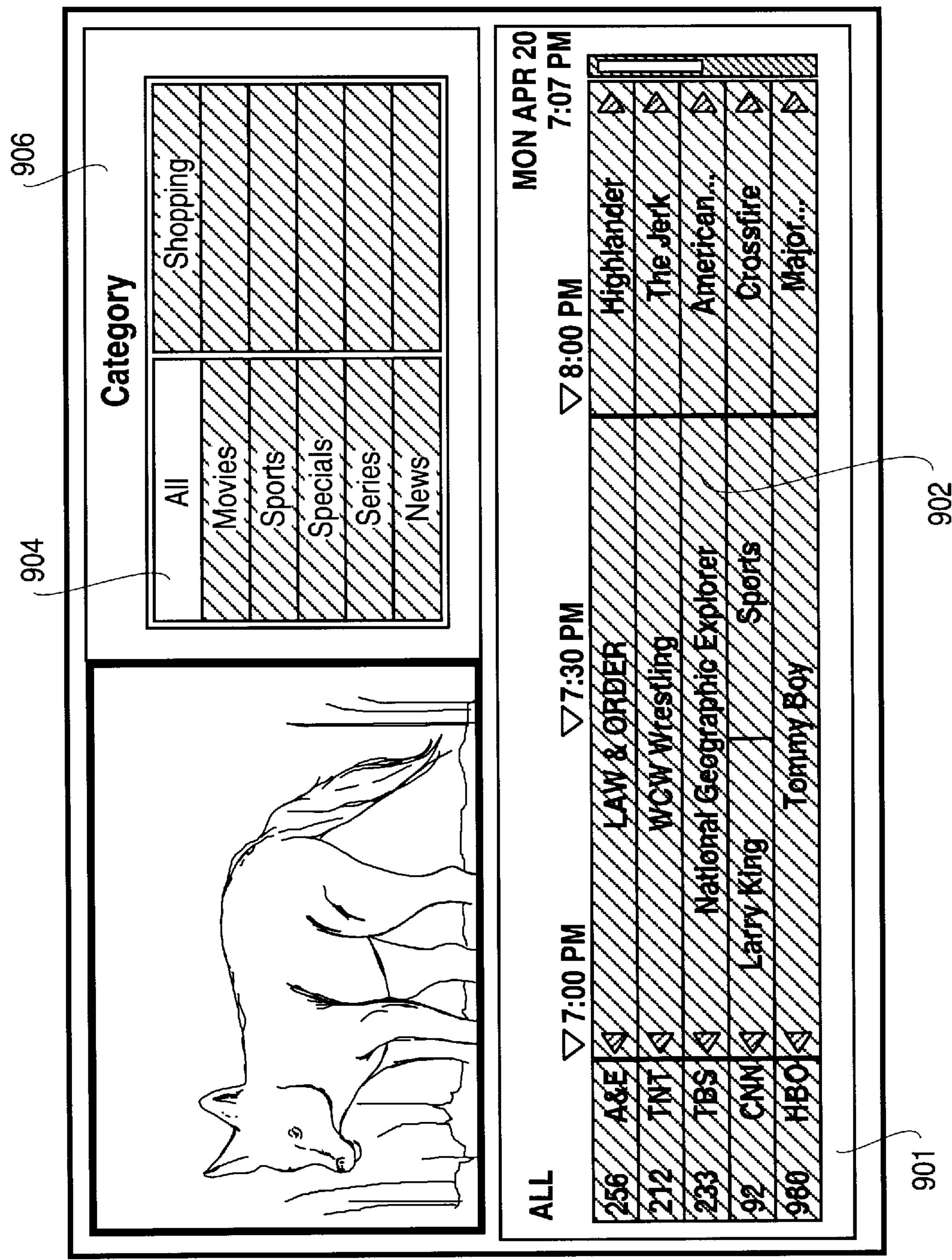
FIG. 9 illustrates the display of an electronic category guide with an electronic program guide in one embodiment of the present invention.

FIG. 9 illustrates the display of an electronic category guide with an electronic program guide in one embodiment of the present invention. As shown in FIG. 9, and as previously discussed, instead of selecting a display information packet for display at Block 806 of FIG. 8, the user may select an electronic category guide 906 for display with the electronic program guide 901. The electronic category guide 906 includes a number of programming categories 910. The broadcast system then identifies programs on channels that correspond to each category 910 contained in the electronic category guide 906. The programs that correspond to the particular categories of the electronic category guide 906 are then indicated or highlighted on the electronic program guide 901. The system pointer may be manipulated by the user to an area of the electronic category guide 906, and system pointer status is indicated. When the system pointer is pointing to a category block the category block is displayed as highlighted on the electronic category guide 906. The system pointer is pointing to the "ALL" category block 904 in the electronic category guide 906 as indicated by the highlighting of category Block 904.

Figure 10:
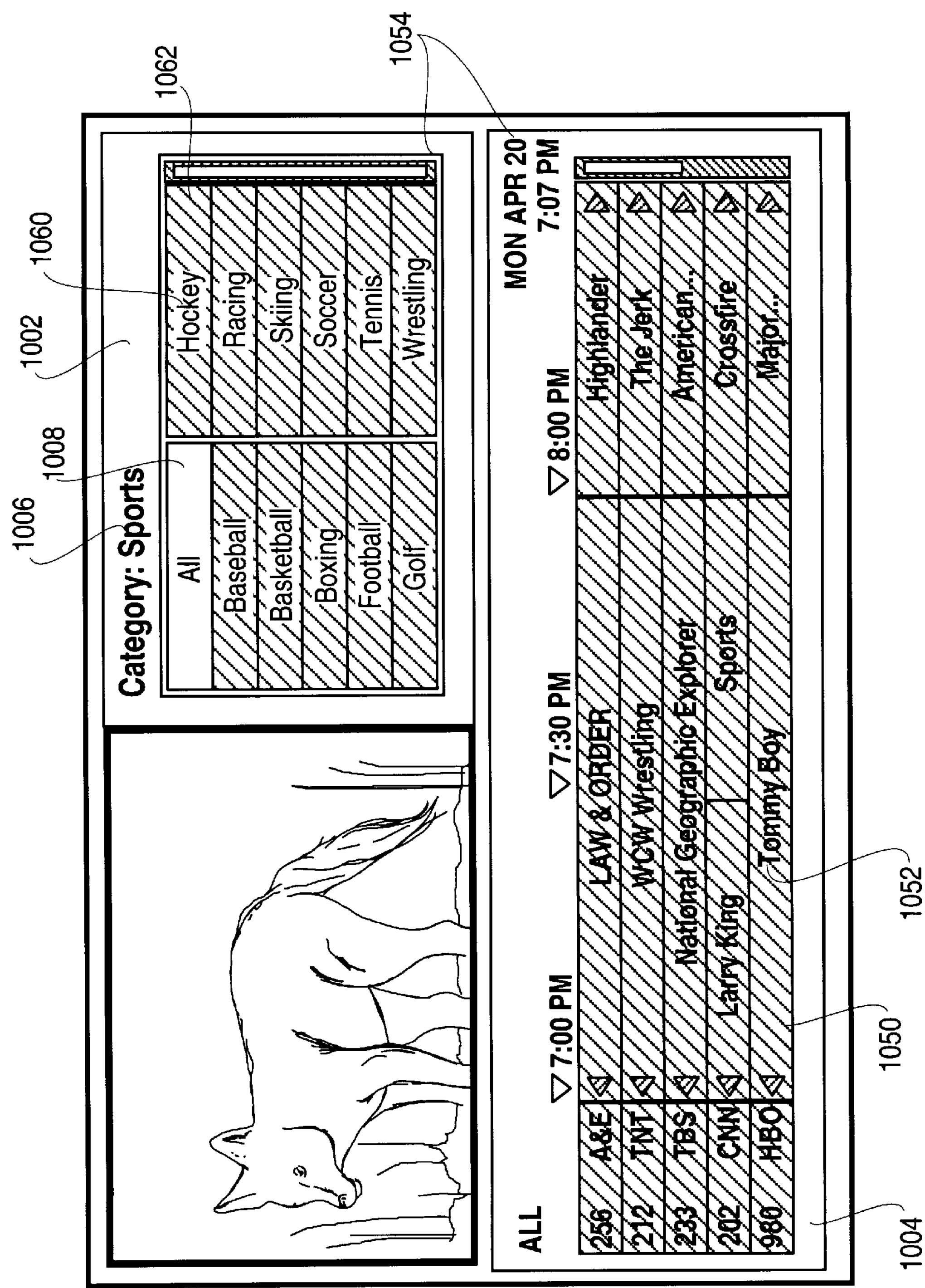
FIG. 10 illustrates the display of an electronic subcategory guide with an electronic program guide in one embodiment of the present invention.

If the user, typically using the broadcast system remote control, selects one of the categories from the electronic category guide, then the display of the electronic category guide is replaced with a display of an electronic subcategory guide. FIG. 10 illustrates the display of an electronic subcategory guide 1002 with an electronic program guide 1004 in one embodiment of the present invention. The selected category 1006 is displayed along with the electronic subcategory guide 1002 and the electronic program guide 1004. The electronic subcategory guide 1002 includes a number of subcategories 1008. The broadcast system identifies programs on channels that correspond to each subcategory contained in the electronic subcategory guide 1002. The programs that correspond to the particular categories of the electronic subcategory guide 1002 are indicated or highlighted on the electronic program guide. The status of the system pointer is shown and changed as the pointer is moved about the display. For example, the system pointer may be manipulated by the user to an area of the electronic subcategory guide 1002. When the system pointer is pointing to a subcategory block the subcategory block is displayed as highlighted on the electronic category guide. In FIG. 10, the system pointer is pointing to the "ALL" subcategory block 1008 in the electronic subcategory guide 1002 as indicated by the highlighting of subcategory block 1008.

As described in the foregoing text, the broadcast system is user friendly and highly interactive: by using the remote which provides the user the ability to move the system pointer and select functions using preprogrammed buttons or areas of the display, the user can access many different functions and features. To distinguish between those areas of the display that the user can interact with from those that the user cannot interact with, the display of the present invention preferably includes textured and non-textured areas. The textured areas represent those areas of the display that do not correspond to any function if attempted to be selected by a user. The textured areas reduce display flicker and assist the user in identifying interactive areas of the electronic program guide.

Figure 11:
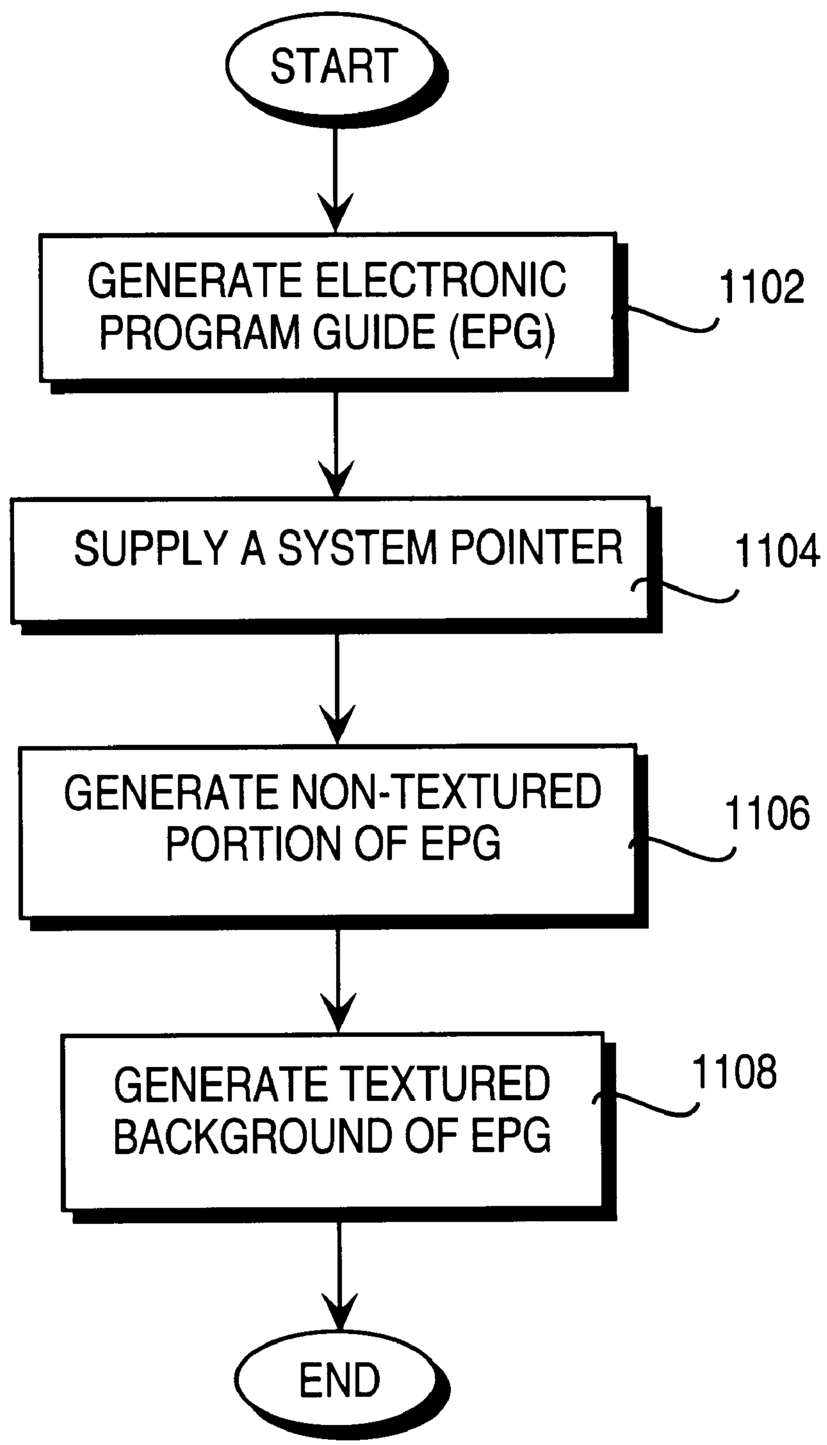
FIG. 11 is an exemplary flowchart illustrative of providing textured and non-textured portions of an electronic program guide in one embodiment of the present invention.

FIG. 11 is an exemplary flowchart illustrative of providing textured and non-textured portions of an electronic program guide in one embodiment of the present invention. An electronic program guide is generated, at Block 1102, and a system pointer is supplied, at Block 1104. The system pointer is under the control of the user. Operation continues at Block 1106, at which a non-textured portion of the electronic program guide is generated. The user can interact with functions of the electronic program guide using the system pointer manipulated by the remote within the non-textured portion of the electronic program guide. At Block 1108, a textured background is generated for the electronic program guide in which the user cannot interact with functions of the electronic program guide.

Referring to FIG. 10, the non-textured portion 1050 of the electronic program guide 1004 contains solid non-textured alphanumerics 1052 displayed on a solid non-textured background 1050. An anti-aliasing font is used to display the alphanumerics 1052.

The non-textured portion of the electronic program guide is generated using a noise-pattern generator. The noise-pattern generator utilizes a number of colors to form a tiled color pattern. In an 8-bit system, the colors are selected from 256 available colors. The noise-pattern generator is a computer algorithm that, in one embodiment of the present invention, is run on a personal computer.

Figure 12:
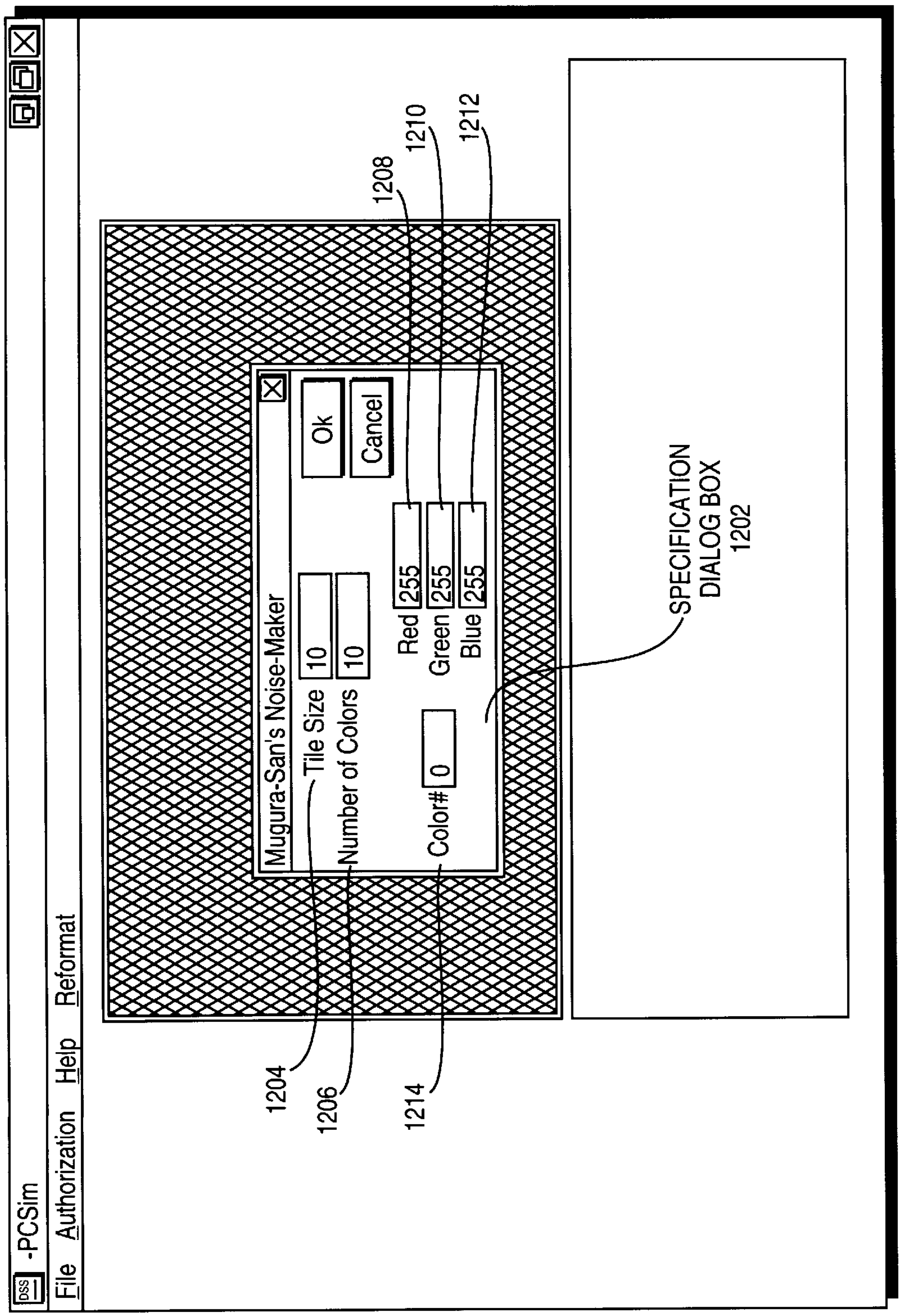
FIG. 12 illustrates a specification dialog box provided by the noise-pattern generator of one embodiment of the present invention.

FIG. 12 illustrates a specification dialog box 1202 provided by the noise-pattern generator of one embodiment of the present invention. The specification dialog box allows for the specification of a tile size 1204, a number of colors 1206 to be used in generating the tile, and a red 1208, green 1210, and blue 1212 component for each color of the number of colors 1206 to be used in generating the tile. The tile size 1204 is specified as the pixel dimensions of a square. For example, the tile size 1204 of 10 provides a 10 pixel by 10 pixel tile. The noise-pattern generator randomly uses all of the number of colors 1206 specified in assigning color values to pixels in the tile specified by the user. Therefore, as the number of colors 1206 selected is 10, each of the 10 different colors will be randomly assigned to each pixel within the 10 pixel by 10 pixel tile. Each of the 10 colors specified is defined using the red 1208, green 1210, and blue 1212 component values in the specification dialog box 1202.

Following specification of the tile size, number of colors, and color components for each color of the number of colors, the noise-pattern generator generates a tile according to these specifications. The tile is saved as a bitmap and, in one embodiment of the noise-pattern generator of the present invention, the bitmap is converted into C language program code by the noise-pattern generator. The C program code of the bitmap is compiled and downloaded to the broadcast system integrated receiver/decoder (IRD). When the electronic program guide is selected by the user of the broadcast system, the IRD draws the tile according to the aforementioned specified parameters to the area specified as the background of the electronic program guide. If the specified tile size is smaller than the pixel dimensions of the background area, the IRD draws multiple copies of the specified tile until the background area is completely covered in tiles.

In one embodiment of the noise-pattern generator of the present invention, a number of different tiles are loaded into the IRD. Each tile has a different combination of colors. The broadcast system user is presented with a menu having a pallet containing this number of tile selections. Upon selection of a specific tile by the user, the IRD draws multiple copies of the specified tile so as to completely cover the electronic program guide background area.

Referring again to FIG. 10, when the electronic subcategory guide 1002 is displayed, the electronic subcategory guide 1002 contains solid non-textured alphanumerics 1060 displayed on a solid non-textured background 1062. All aforementioned characteristics of the electronic program guide non-textured areas apply to the electronic subcategory guide non-textured areas. The electronic subcategory guide also has a textured background 1054, and all aforementioned characteristics of the electronic program guide textured background apply to the electronic subcategory guide textured background.

When the electronic category guide is displayed as shown in FIG. 9 the electronic subcategory guide contains solid non-textured alphanumerics displayed on a solid non-textured background. All aforementioned characteristics of the electronic program guide non-textured areas apply to the electronic category guide non-textured areas. The electronic category guide also has a textured background, and all aforementioned characteristics of the electronic program guide textured background apply to the electronic category guide textured background.

The invention has been described in conjunction with the preferred embodiment. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a multiple channel broadcasting system in which programs are broadcasted for display on a screen, a method for generating an on-screen guide for a user to select channels to view, comprising the steps of:

generating an electronic program guide that includes information displayed on the screen, wherein the information identifies a plurality of channels and programming on the channels in the broadcasting system;

supplying a system pointer on the screen under control of the user;

generating a non-textured portion of said electronic program guide wherein said user can interact with functions of said electronic program guide;

generating a textured background of said electronic program guide wherein said user cannot interact with functions of said electronic program guide, the textured background reducing display flicker and assisting the user in identifying the interactive areas of said display.

2. The method as set forth in claim 1, wherein said non-textured portion of said electronic program guide contains solid non-textured alphanumerics displayed on a solid non-textured background.

3. The method as set forth in claim 1, wherein said textured background is generated using a noisy pattern texture, said noisy pattern texture reducing the aliasing, said reduced aliasing reducing said display flicker with no increase in system memory usage.

4. The method as set forth in claim 3, wherein an anti-aliased font is used to display text in the non-textured portion of the electronic program guide and an aliased font is used to display text in the textured background.

5. The method as set forth in claim 3, further comprising the step of generating a textured background using a noise-pattern generator, said noise-pattern generator providing a tiled color pattern on the textured background, said tiled color pattern randomly generated from a plurality of colors, said tiled color pattern generated using a selectable tile size and a selectable number of said plurality of colors.

6. A computer system comprising:

a processor configured to be coupled to a display device, said processor, configured to generate an electronic program guide identifying a plurality of channels and programming on the channels in a multiple channel broadcasting system, wherein the electronic program guide appears on the display device;

configured to supply a system pointer on the display device under control of a user;

configured to generate a non-textured portion of said electronic program guide wherein said non-textured portion indicates functions of said electronic program guide with which said user can interact;

configured to generate a textured background of said electronic program guide, the textured background reducing display flicker and indicating areas of said display with which the user cannot interact.

7. The computer system as set forth in claim 6, wherein said non-textured portion of said electronic program guide contains solid non-textured alphanumerics displayed on a solid non-textured background, wherein an anti-aliased font is used to display said alphanumerics.

8. The computer system as set forth in claim 6, wherein said textured background is generated using a noisy pattern texture, said noisy pattern texture reducing the aliasing, said reduced aliasing reducing said display flicker with no increase in system memory usage.

9. The computer system as set forth in claim 8, wherein said textured background is generated using a noise-pattern generator, said noise-pattern generator providing a tiled color pattern on the textured background, said tiled color pattern randomly generated from a plurality of colors, said tiled color pattern generated using a selectable tile size and a selectable number of said plurality of colors.

10. The computer system as set forth in claim 8, wherein an anti-aliased font is used to display text in the non-textured portion of the electronic program guide and an aliased font is used to display text in the textured background.

11. The computer system as set forth in claim 6, wherein an electronic category guide is displayed along with said electronic program guide, said electronic category having a non-textured portion on a textured background.

12. A system for generating an on-screen guide for a user to select channels to view in a multiple channel broadcasting system in which programs are broadcasted for display on a screen, comprising:

an electronic program guide identifying a plurality of channels and programming on the channels in the broadcasting system, wherein the electronic program guide is visible on the screen;

a system pointer on the screen under control of the user;

a non-textured portion of said electronic program guide wherein said user can interact with functions of said electronic program guide indicated by said non-textured portion;

a textured background of said electronic program guide wherein said user cannot interact with functions of said electronic program guide indicated by said textured background, the textured background reducing display flicker and assisting the user in identifying the interactive areas of said display.

13. The system as set forth in claim 12, wherein said non-textured portion of said electronic program guide contains solid non-textured alphanumerics displayed on a solid non-textured background.

14. The system as set forth in claim 13, wherein an anti-aliasing font set is used to display said alphanumerics.

15. The system as set forth in claim 12, wherein said textured background is generated using a noisy pattern texture, said noisy pattern texture reducing the aliasing, said reduced aliasing reducing said display flicker with no increase in system memory usage.

16. The system as set forth in claim 15, wherein said textured background is generated using a noise-pattern generator, said noise-pattern generator providing a tiled color pattern on the textured background, said tiled color pattern randomly generated from a plurality of colors, said tiled color pattern generated using a selectable tile size and a selectable number of said plurality of colors.

17. The system as set forth in claim 12, wherein an electronic category guide is displayed along with said electronic program guide, said electronic category guide having a non-textured portion on a textured background.

18. A computer readable medium containing executable instructions which, when executed in a processing system, causes the system to perform the steps for generating an on-screen guide for a user to select channels to view in a multiple channel broadcasting system comprising:

generating an electronic program guide identifying a plurality of channels and programming on the channels in the broadcasting system;

displaying the electronic program guide on a screen of a display device;

supplying a system pointer on the screen under control of the user;

generating a non-textured portion of said electronic program guide wherein said user can interact with functions of said electronic program guide indicated by said non-textured portion;

generating a textured background of said electronic program guide wherein said user cannot interact with functions of said electronic program guide indicated by said textured portion, the textured background reducing display flicker and assisting the user in identifying the interactive areas of said display.

19. The computer readable medium as set forth in claim 18, further causing the system to perform the step of wherein said non-textured portion of said electronic program guide contains solid non-textured alphanumerics displayed on a solid non-textured background, wherein an anti-aliasing font set is used to display said alphanumerics.

20. The computer readable medium as set forth in claim 18, wherein said textured background is generated using a noisy pattern texture, said noisy pattern texture reducing the aliasing, said reduced aliasing reducing said display flicker with no increase in system memory usage.

21. The computer readable medium as set forth in claim 20, further causing the system to perform the step of generating a textured background using a noise-pattern generator, said noise-pattern generator providing a tiled color pattern on the textured background, said tiled color pattern randomly generated from a plurality of colors, said tiled color pattern generated using a selectable tile size and a selectable number of said plurality of colors.

22. The computer readable medium as set forth in claim 18, wherein an electronic category guide is displayed along with said electronic program guide, said electronic category guide having a non-textured portion on a textured background.

* * * * *